July 16, 1968
R. A. SHIPMAN
3,392,415
ANTI-LIFT WINDSHIELD WIPER
Filed Oct. 12, 1966
2 Sheets-Sheet 1
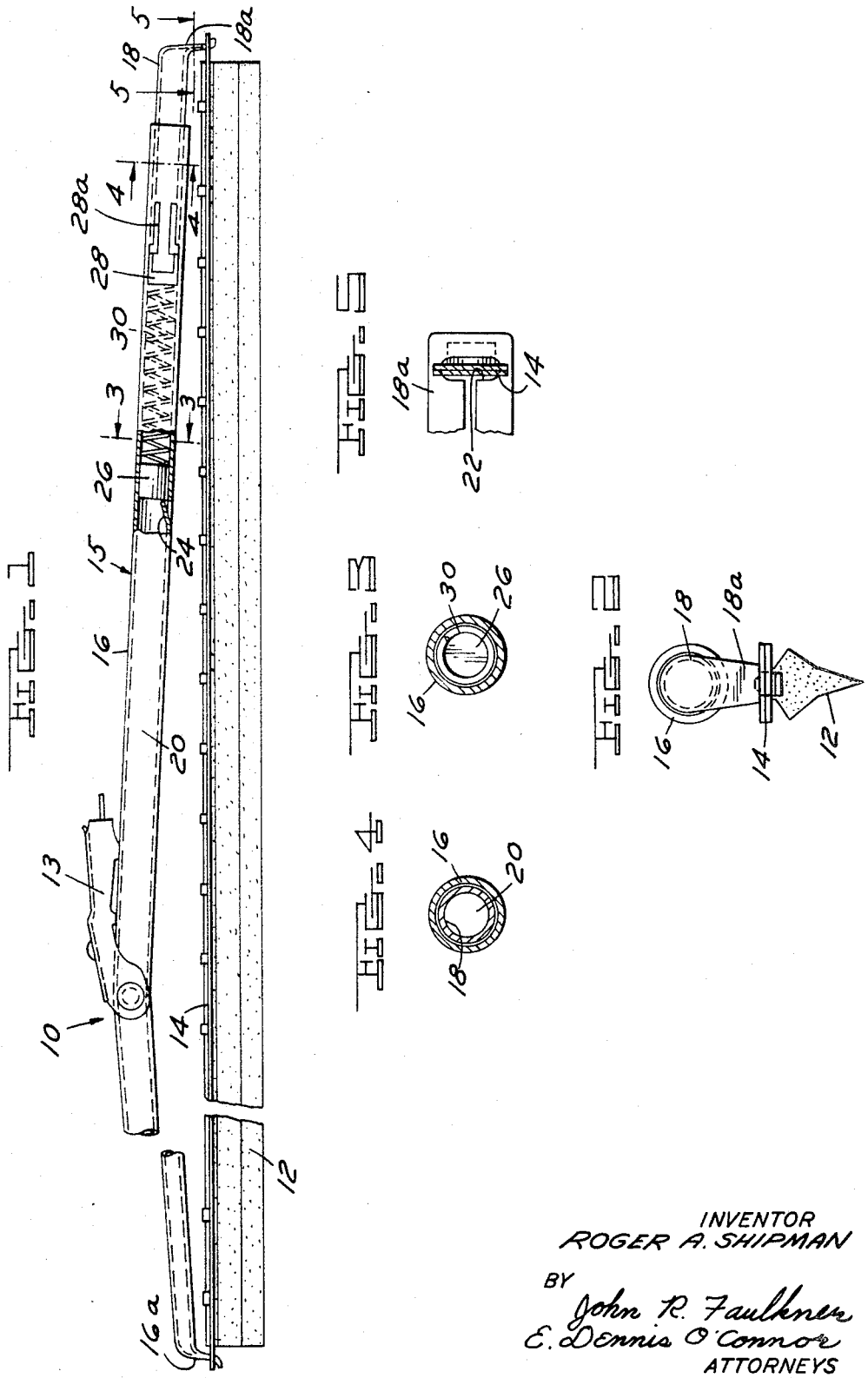
INVENTOR
ROGER A. SHIPMAN
BY
John R. Faulkner
E. Dennis O'Connor
ATTORNEYS

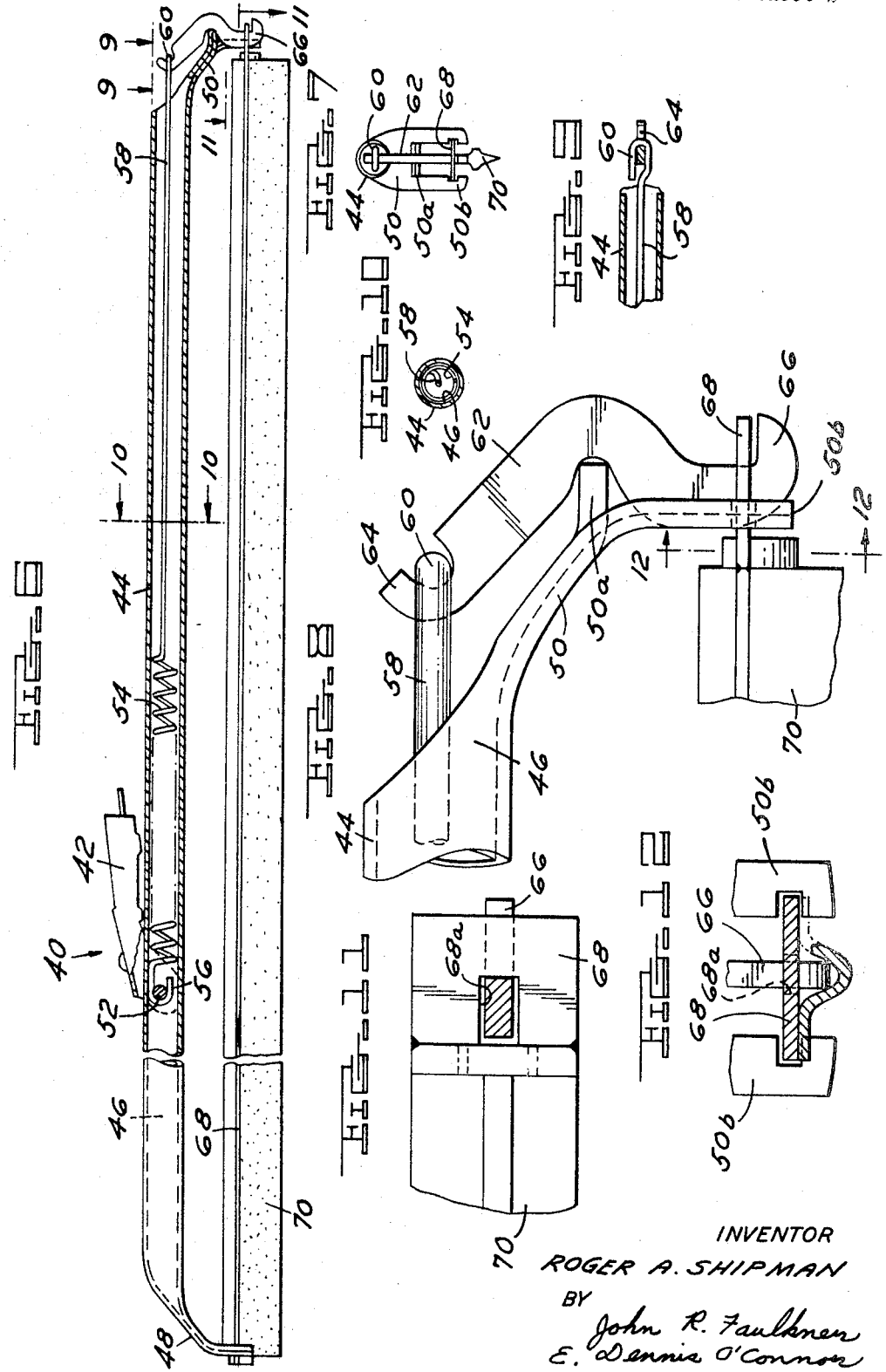

United States Patent Office 3,392,415
Patented July 16, 1968

3,392,415
ANTI-LIFT WINDSHIELD WIPER
Roger A. Shipman, Livonia, Mich., assignor to Ford Motor Company, Dearborn, Mich., a corporation of Delaware
Filed Oct. 12, 1966, Ser. No. 586,285
10 Claims. (Cl. 15—250.38)

This invention relates to a windshield wiper assembly and in particular to a windshield wiper assembly having anti-lift characteristics so that it will remain in suitable wiping contact with a vehicle windshield when the motor vehicle is operated at a high rate of speed.

With the advent of curved windshields on motor vehicles, it became necessary that windshield wiper design provide flexible wiping members capable of assuming a variety of curvatures for intimate continuous contact with such windshields, and also that the flexible wiping members be forced against the windshields with a sufficient pressure to cause the satisfactory removal of foreign matter. Prior art design for acomplishing these desired ends include a variety of arrangements for allowing the windshield wiping member to remain flexible and thereby assume a variety of curvatures, while providing spaced support members along the length of said wiping member to act as pressure points for urging the flexible wiping member against the windshield. An example of such an arrangement is the well known whiffletree design.

A disadvantage attendant such design is that a plurality of structural members must be present to allow the flexible wiping element to be movable and yet provide a requisite pressure point along the length of said wiping element. The greater the number and complexity of such structural members, the greater the propensity for the windshield wiper to lift during high speed operation of the motor vehicle with which it is associated due to the rush of air over such structural members. During high speed driving, this propensity for lift may become so great as to seriously impair the windshield wiping efficiency of the device due to the decrease in pressure of the flexible wiping member against the windshield. In extreme cases, it has been known that the lift caused by the rushing air has been so great as to cause the flexible wiping member to lift out of contact with the windshield to be wiped.

It is, therefore, an object of this invention to provide a windshield wiper assembly such that the flexible wiping member may assume a variety of curvatures as it moves over the windshield surface and which provides for a sufficient wiping pressure urging the flexible wiping member into contact with the vehicle windshield.

A further object of this invention is to provide a windshield wiper assembly that will not be subjected to substantial lift forces during the high speed operation of the motor vehicle.

A windshield wiper assembly constructed in accordance with this invention comprises an elongate, hollow bow, a substantial portion of which will not be subjected to lift forces during high speed vehicle operation, and a flexible wiping member having a wiping edge. Means secure one end of said wiping member to one end of said bow. Resilient means are located within said bow and are operatively connected by coupling means to the other end of said flexible wiping member. Said resilient means thus exert a tensioning force on the flexible wiping member.

Further objects and advantages of this invention will become apparent when the following description is considered in conjunction with the accompanying drawings wherein like numerals indicate identical parts in the various views thereof and where:

FIGURE 1 is a side elevation view, partially in section, of a first embodiment of this invention;
FIGURE 2 is an end view of the embodiment shown in FIGURE 1;
FIGURE 3 is a sectional view taken along the line 3—3 of FIGURE 1;
FIGURE 4 is a sectional view taken along the line 4—4 of FIGURE 1;
FIGURE 5 is a sectional view taken along the line 5—5 of FIGURE 1;
FIGURE 6 is a side elevational view, partially in section, of a second embodiment of this invention;
FIGURE 7 is an end view of the device illustrated in FIGURE 1;
FIGURE 8 is an enlarged illustration of the right end of the device shown in FIGURE 1;
FIGURE 9 is a sectional view taken along the line 9—9 of FIGURE 1;
FIGURE 10 is a sectional view taken along the line 10—10 of FIGURE 1;
FIGURE 11 is a sectional view taken along the line 11—11 of FIGURE 1; and
FIGURE 12 is a sectional view taken along the line 12—12 of FIGURE 8.

Referring now in detail to the drawings and in particular to the embodiment of the invention illustrated in FIGURES 1–5, the numeral 10 denotes a windshield wiper assembly including a wiping member comprising a flexible blade or wiping element 12 and a carrier 14 joined to the blade along the length thereof. A wiper arm 13 is pivotally connected to a bow 15 comprising tubular members 16 and 18 having essentially circular cross sections. Tubular member 18 is slidable, in a telescoping manner, inside tubular member 16. The end of tubular member 16 remote from tubular member 18 has formed integrally therewith an extension 16a. A similar extension 18a is formed integrally on one end of tubular member 18. Carrier 14 is joined at its extremities in the conventional manner in slots 22 (one shown) to extensions 16a and 18a.

A plug 26 is located in bore 20 of tubular member 16 and is held against movement to the left by a lance 24. A second plug 28, having a portion of reduced diameter 28a extending into tubular member 18, blocks the open end of tubular member 18. A compression spring 30 is located in bore 20 between plugs 26 and 28.

The force exerted on plugs 26 and 28 by compression spring 30 is transmitted via tubular members 16 and 18 and extensions 16a and 18a to carrier 14 and results in the windshield wiping member being in tension. It may thus be seen that when flexible blade 12 is pressed against a curved windshield and assumes the contour thereof, a component of this tensioning force is directed towards the windshield and tends to force blade 14 into intimate wiping engagement with said windshield for the efficient cleaning thereof. The only structural member required for this arrangement, bow 15, because of its circular cross section, has a theoretical wind lift of zero. Thus, when a vehicle utilizing this windshield wiper arrangement is operated at a high rate of speed, the requisite contact force between blade 12 and the vehicle windshield is not impaired.

A second embodiment of windshield wiper assembly 40 constructed in accordance with this invention is illustrated in FIGURES 6–12. A wiper arm 42 is pivotally connected to a tubular bow 44 having a central bore 46 and a circular cross section. Extensions 48 and 50 of reduced cross section are formed integrally on the ends of bow 44. Extension 50 is bifurcated into tab 50a extending essentially parallel to the axis of bow 44 and U-shaped portion 50b, the arms of which extend essentially normal to bow 44.

A tension spring 54 is located in bore 46 and has one end 56 thereof engaging a pin 52 that is secured to the inner wall of bow 44. The other end 58 of spring 54 is elongated and is formed in the shape of a hook 60 at its end.

A lever 62 having two hooked ends 64 and 66 is pivoted on extension portion 50a and bow 44. Hooked end 64 cooperates with hook 60 to secure spring 54 to lever 62. Hooked end 66 extends through a recess 68a formed in a carrier 68, that mounts a flexible wiping blade 60. The end of carrier 68 remote from lever 62 is secured to bow extension 48 in the conventional manner.

It may thus be seen that the force exerted by tension spring 54 tends to rotate lever 62 in a counterclockwise direction about its pivot on tab 50a. Thus the force of spring 54 is transmitted, via lever 62, to the wiping member, which member is thereby put in tension.

This invention thus provides a windshield wiper assembly having anti-lift characteristics because of its simplified structural design, yet provides forces causing the flexible wiping element to be urged into intimate contact with a curved vehicle windshield due to said wiping element being in tension.

It is to be understood that this invention is not limited to the exact construction illustrated and described above and that various changes and modifications may be made without departing from the spirit and scope of the invention as defined by the following claims.

What is claimed is:

1. A windshield wiper assembly comprising an elongate hollow bow, a flexible wiping member having a wiping edge, means securing one end of said wiping member to said bow, resilient means located within said bow, and connecting means operatively coupling said resilient means to the other end of said member, said resilient means exerting a tensioning force on said member through said connecting means.

2. The apparatus of claim 1, including a wiper arm pivotally connected to said bow, said bow having a cross section that is essentially circular.

3. The apparatus of claim 1, wherein said bow is tubular intermediate its end portions and said resilient means comprises a spring.

4. Apparatus according to claim 1, wherein said wiping member comprises a wiping element, one edge of which comprises said wiping edge, and a carrier secured to said wiping element along the length thereof, one end of said carrier secured to said connecting means.

5. Apparatus according to claim 1, wherein said bow comprises a pair of tubular members in telescoping relationship and said resilient means comprises a compression spring exerting a force tending to separate said tubular members.

6. Apparatus according to claim 1, wherein said bow is tubular intermediate its end portions, said resilient means comprising a tension spring, said connecting means comprising a lever pivoted on said bow, said lever secured to said spring at one side of said pivot and to said other end of said member at the other side of said pivot.

7. A windshield wiper assembly comprising an elongate flexible wiping member having a wiping edge, a bow extending along the length of said wiping member, said bow including a pair of substantially tubular members, one of said tubular members extending into the other of said members in a sliding telescopic relationship, one end of said wiping member secured to one of said tubular members, the other end of said wiping member secured to the other of said tubular members, and resilient means positioned within at least one of said tubular members and exerting a force on said tubular members tending to separate said tubular members.

8. The device of claim 7 wherein said tubular members have an essentially circular cross section intermediate the end portions of said bow.

9. A windshield wiper assembly comprising an elongate flexible wiping member having a wiping edge, an elongate tubular bow extending along the length of said wiping member, one end of said wiping member secured to one end of said bow, a tension spring located within said bow, a lever movably pivoted along its length on the other end of said bow, said spring and the other end of said wiping member secured to said lever at opposite sides of the pivot point.

10. The device of claim 9, wherein the cross section of said tubular bow is essentially circular intermediate its end points.

References Cited
UNITED STATES PATENTS

| 2,659,097 | 11/1953 | Morton | 15—250.38 |
| 3,132,367 | 5/1964 | Wise | 15—250.42 |

FOREIGN PATENTS

| 932,232 | 7/1963 | Great Britain. |

CHARLES A. WILLMUTH, *Primary Examiner.*